US011456009B1

(12) United States Patent
Liu (10) Patent No.: US 11,456,009 B1
(45) Date of Patent: Sep. 27, 2022

(54) SHARED DISK CONFIGURATION IN A MULTIPLE ACTUATOR HARD DISK DRIVE

(71) Applicant: Western Digital Technologies, Inc., San Jose, CA (US)

(72) Inventor: Yanning Liu, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/475,217

(22) Filed: Sep. 14, 2021

(51) Int. Cl.
*G11B 5/48* (2006.01)

(52) U.S. Cl.
CPC .......... *G11B 5/4826* (2013.01); *G11B 5/4813* (2013.01); *G11B 5/4833* (2013.01)

(58) Field of Classification Search
CPC .... G11B 5/4826; G11B 5/4813; G11B 5/4833
See application file for complete search history.

(56) References Cited

U.S. PATENT DOCUMENTS

| 5,218,496 | A | | 6/1993 | Kaczeus | |
| 5,761,007 | A | * | 6/1998 | Price | G11B 5/4813 |
| 5,835,311 | A | * | 11/1998 | Brooks, Jr. | G11B 5/5521 |
| 6,636,380 | B2 | * | 10/2003 | Goeke | G11B 33/148 |
| 7,576,955 | B1 | * | 8/2009 | Yang | G11B 5/4833 |
| | | | | | 360/266 |
| 7,760,463 | B2 | | 7/2010 | Ward et al. | |
| 8,064,168 | B1 | * | 11/2011 | Zhang | G11B 5/486 |
| | | | | | 360/245.9 |
| 9,183,862 | B1 | * | 11/2015 | Shah | G11B 5/4806 |
| 9,361,919 | B1 | | 6/2016 | Lieu et al. | |
| 10,332,555 | B1 | * | 6/2019 | Keshavan | G11B 5/5578 |
| 10,475,475 | B2 | * | 11/2019 | Hasegawa | G11B 5/4846 |
| 10,657,993 | B1 | * | 5/2020 | Uehara | G11B 25/043 |
| 10,811,045 | B2 | | 10/2020 | Mendonsa et al. | |
| 11,017,803 | B1 | * | 5/2021 | Yoshikawa | G11B 5/4813 |
| 2015/0146322 | A1 | * | 5/2015 | Bi | G11B 19/2009 |
| | | | | | 360/99.08 |
| 2018/0226091 | A1 | | 8/2018 | Tan et al. | |

(Continued)

OTHER PUBLICATIONS

Author Unknown, Mass-Storage Structure, 17 pages, downloaded from https://www.cs.uic.edu/~jbell/CourseNotes/OperatingSystems/10_MassStorage.html, as early as Jul. 13, 2021.

(Continued)

*Primary Examiner* — Brian E Miller
(74) *Attorney, Agent, or Firm* — John D. Henkhaus (57) ABSTRACT

A multiple-actuator hard disk drive includes multiple head-stack assemblies (HSA) and a disk stack including a shared disk operated upon by both of the HSAs. Generally to provide more space between the HSAs such as for routing electrical traces, the distance between the shared disk and each of the upper and lower adjacent disks is greater than the distance between each of the upper and lower adjacent disks and the next adjacent disk. Each arm tip of the arms operating upon the shared disk may be thicker than other arm(s) operating upon other disks in the stack, so that the z-height between each head slider and corresponding disk surface is maintained in view of the differing disk spacing. Suspension tails for the arms that operate on the shared disk may be biased to offset away from the shared disk to provide for more clearance between the HSAs.

20 Claims, 5 Drawing Sheets

(56) References Cited

U.S. PATENT DOCUMENTS

2018/0358038 A1* 12/2018 Keshavan ............ G11B 5/5521
2019/0287558 A1 9/2019 Hasegawa
2019/0295578 A1* 9/2019 Kraus .................. G11B 5/4813
2020/0294538 A1* 9/2020 Uehara ................ G11B 25/043
2020/0302958 A1* 9/2020 Hayasaka ............ G11B 5/4813

OTHER PUBLICATIONS

Sanders, James, Seagate preparing dual-actuator hard drive for data centers: Will it work?, TechRepublic, Storage, Mar. 5, 2019, 6 pages, TechRepublic, downloaded from https://www.techrepublic.com/article/seagate-preparing-dual-actuator-hard-drive-for-data-centers-will-it-work/.
Seagate, MACH.2 Multi-Actuator Hard Drives, Seagate India, 9 pages, downloaded from https://www.seagate.com/in/en/innovation/multi-actuator-hard-drives/# as early as Jul. 13, 2021.

* cited by examiner

Prior Art

SHARED DISK CONFIGURATION IN A MULTIPLE ACTUATOR HARD DISK DRIVE

FIELD OF EMBODIMENTS

Embodiments of the invention may relate generally to data storage devices such as hard disk drives and particularly to approaches to a shared-disk multi-actuator hard disk drive.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write transducer (or read-write "head") that is positioned over a specific location of a disk by an actuator. A read-write head makes use of magnetic fields to write data to, and read data from, the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

Increasing areal density (a measure of the quantity of information bits that can be stored on a given area of disk surface) is one of the on-going goals of hard disk drive technology evolution. In one form, this goal manifests in the type of high-capacity HDDs that are especially attractive in the context of enterprise, cloud computing/storage, and data center environments. In recent years the growth in areal density has not kept pace with the trends of years past. This has shifted the burden on the mechanics to boost capacity increases by increasing the number of disks within the prescribed form factor. However, the performance of high-capacity HDDs has not necessarily scaled up commensurately with the increases in capacity. This has led to the need to develop and implement various means to increase high-capacity HDD performance. As these HDDs are primarily used for near line storage in data centers in hyper-scale environments, the performance of these high-capacity drives also has to satisfy the IOPs (Input/Output Operations Per Second) density requirements (in some instances, similarly referred to as IOPs/TB) to minimize latency. This demand has led to a shift to multiple actuators for providing parallel access to data.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Generally, approaches to a shared-disk multi-actuator hard disk drive are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

Introduction

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall the observation that the performance of high-capacity HDDs has not scaled up commensurately with increases in storage capacity. The pressure to increase the performance (e.g., IOPS) by reducing the latencies for data operations of high-capacity HDDs has become even stronger as capacities of HDDs continue to increase. As mentioned, one possible approach to increasing HDD performance is the implementation of multi-actuator systems, in which multiple independently operating actuators are employed to independently and concurrently read from and/or write to multiple recording disks of a disk stack.

Figure 1:
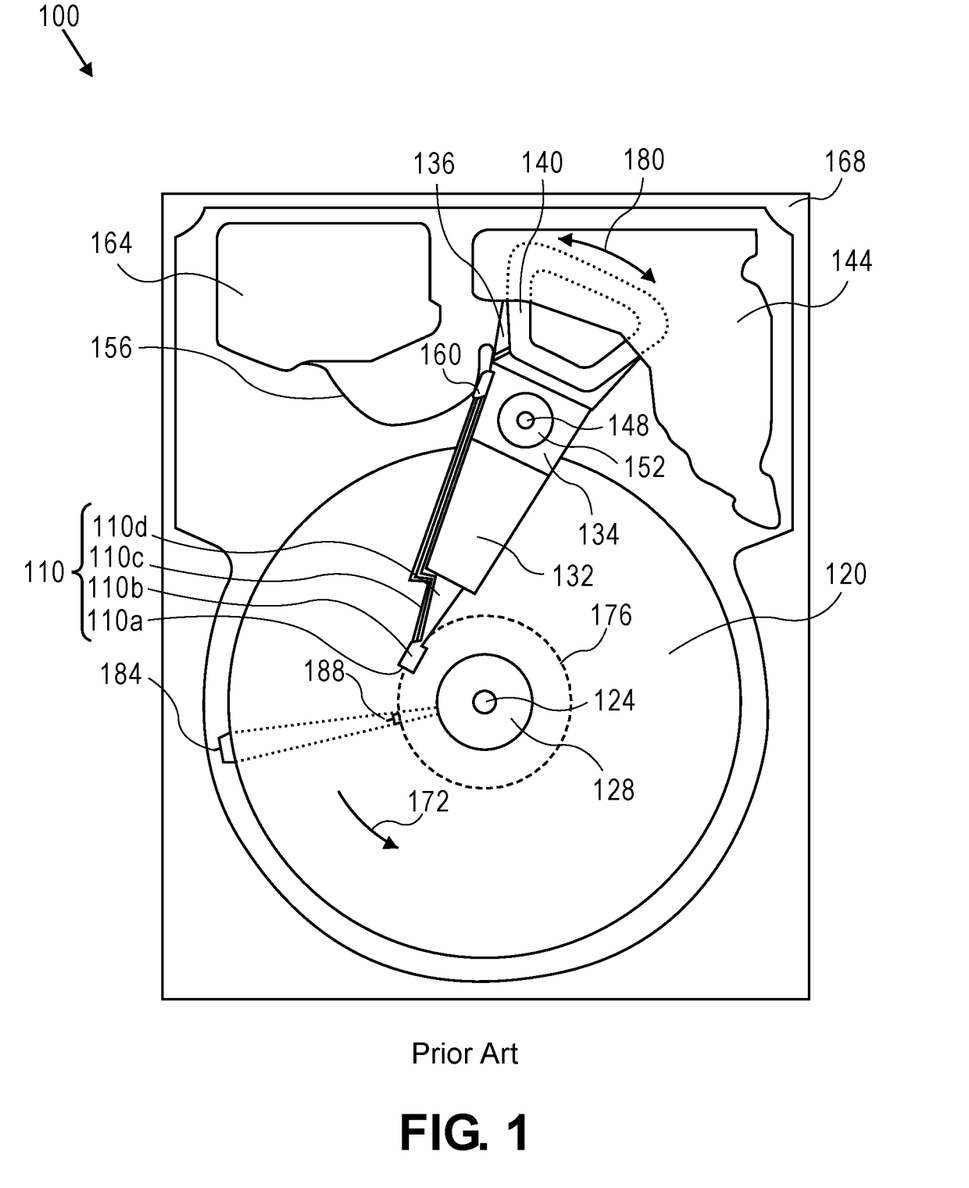
FIG. 1 is a plan view illustrating a hard disk drive (HDD), according to an embodiment.
Figure 2:
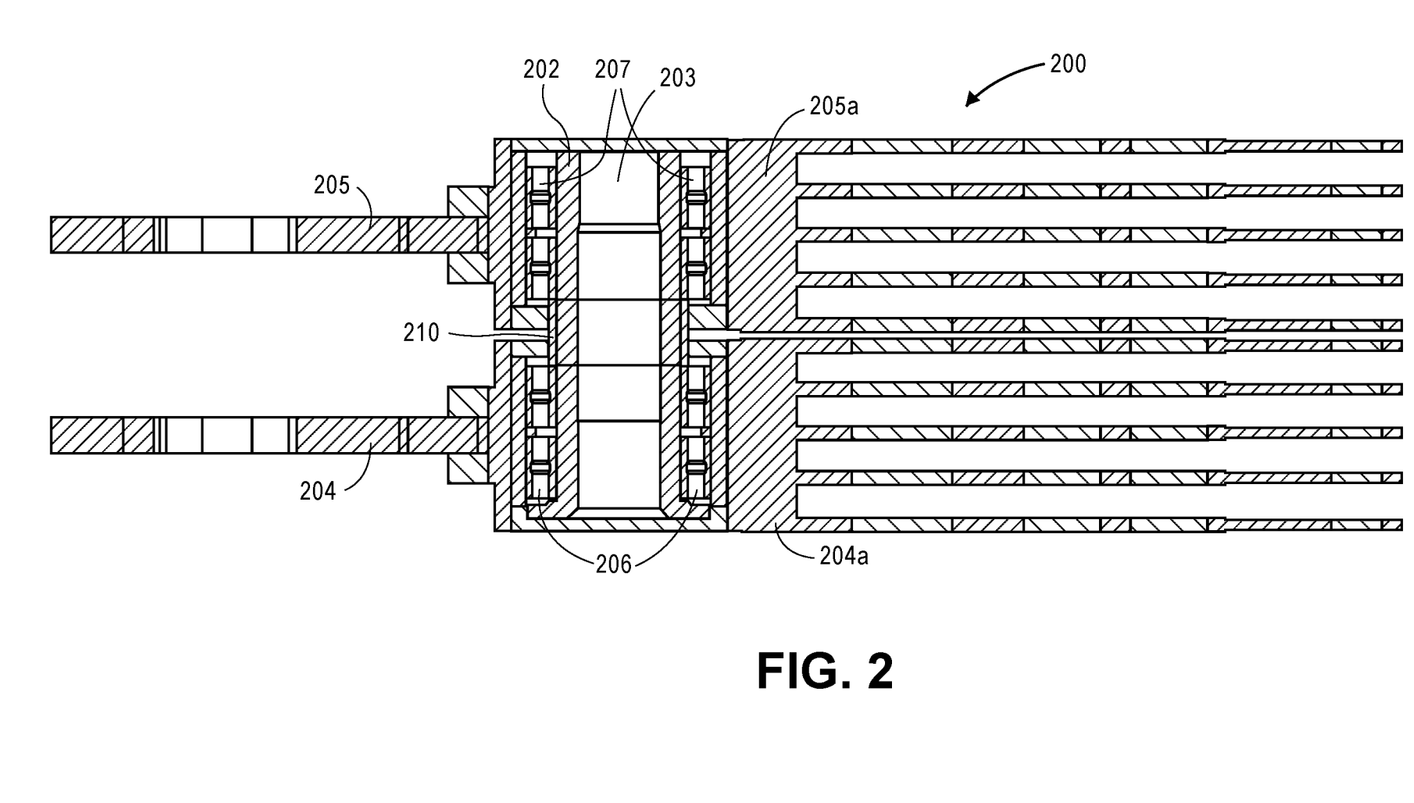
FIG. 2 is a cross-sectional side view illustrating a dual-actuator shared shaft actuator system, according to an embodiment.

FIG. 2 is a cross-sectional side view illustrating a dual-actuator shared shaft actuator system, according to an embodiment. Actuator system 200, generalized, comprises a shaft 202 having a bore 203 at least partially therethrough. According to an embodiment, the shaft 202 is utilized as a pivot shaft, or part of an actuator pivot assembly or shared shaft assembly, for multiple actuators constituent to a multi-actuator shared shaft data storage device such as a hard disk drive (HDD). As such, actuator system 200 comprises the shaft 202, around which a first or lower rotary actuator assembly 204 (e.g., a voice coil actuator, and including a carriage 204a, such as carriage 134 of FIG. 1) is rotatably coupled at a first location of shaft 202, with a lower bearing assembly 206 interposed therebetween, and around which a second upper rotary actuator assembly 205 (e.g., a voice coil actuator, and including a carriage 205a, such as carriage 134 of FIG. 1) is rotatably coupled at a second location of shaft 202, with an upper bearing assembly 207 interposed therebetween. Alternatively and according to an embodiment, the functionality of the shaft 202 utilized as a pivot shaft may be implemented with separate shafts, e.g., one for each respective actuator assembly 204, 205, rather than a shared shaft assembly such as shaft 202. This could provide for decoupling of undesired structural dynamics associated with the independent operation of multiple actuator assemblies, such as actuator assembly 204 and actuator assembly 205, mounted on a single shared shaft.

Since the available z-space (vertical height) within the HDD is typically optimized to maximize the number of disks, the disk pitch would ideally be constant through the entire stack. However, due to additional space needed for the flexible printed circuits (FPCs) corresponding to each actuator and to allow the upper and lower actuators to rotate independently without interference, this becomes a challenging task in view of the need for additional space between the actuators.

Multiple Actuator Hard Disk Drive

Figure 3A:
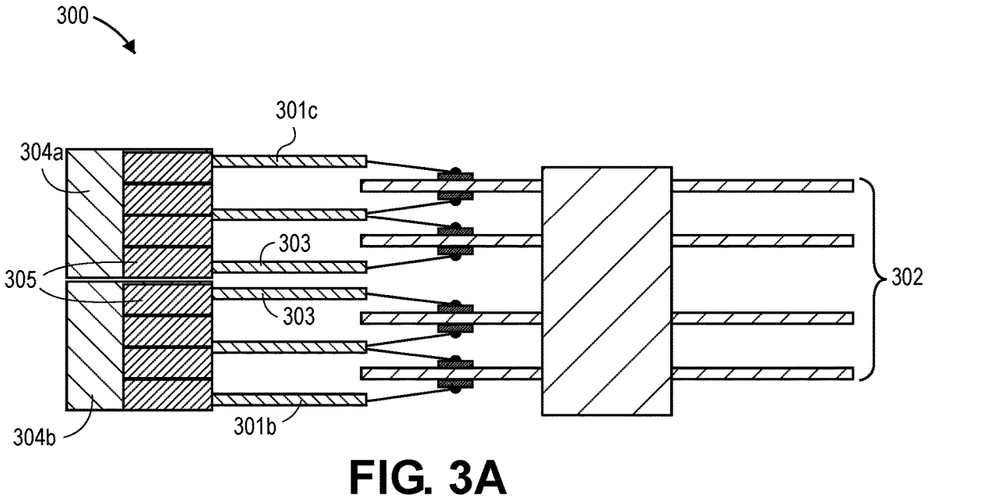
FIG. 3A is a side view diagram illustrating a dual-actuator system having an even number of disks, according to an embodiment.
Figure 3B:
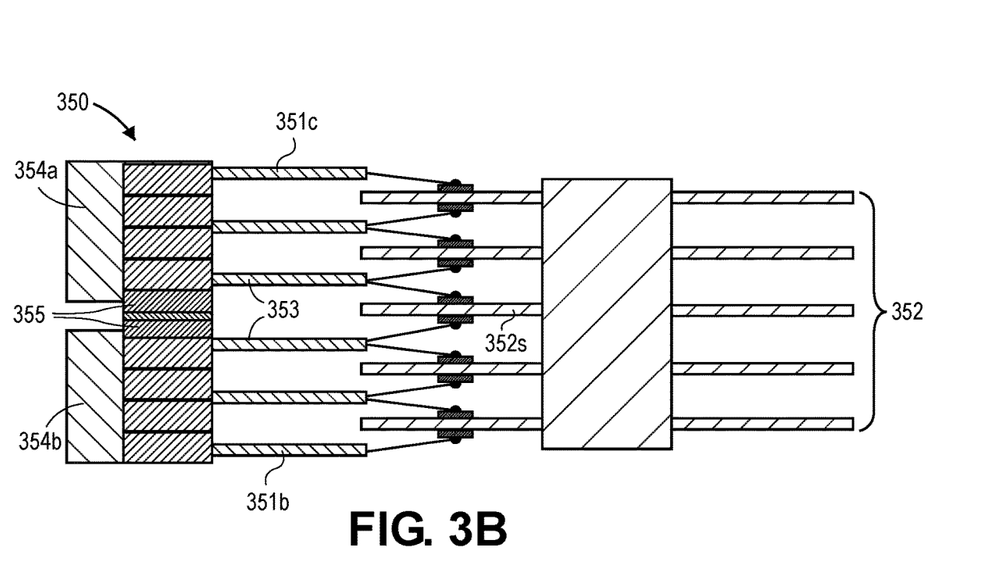
FIG. 3B is a side view diagram illustrating a dual-actuator system having an odd number of disks, according to an embodiment.

FIG. 3A is a side view diagram illustrating a dual-actuator system having an even number of disks, according to an embodiment, and FIG. 3B is a side view diagram illustrating a dual-actuator system having an odd number of disks, according to an embodiment. For a dual-actuator HDD, such as dual-actuator system 300 of FIG. 3A and dual-actuator system 350 of FIG. 3B, each actuator has two end-arms (or outer arms), i.e., a cover facing end-arm 301c, 351c or base facing end-arm 301b, 351b and another "adjacent" end-arm 303, 353 that faces the adjacent complementary actuator. If the number of disks in the disk stack is even, such as with the four (4) disks 302 depicted in FIG. 3A, the adjacent end-arms 303 (i.e., one from each of the two actuators (actuator-facing end-arms)) may need to have one head-gimbal assembly (HGA) each to enable an even split in capacity between the two head-stack assemblies (HSAs) 304a, 304b (or, more broadly, "actuator assemblies"). Thus, the additional z-space required to fit two actuator arms (one actuator-facing end-arm each, from the upper and lower actuators), e.g., adjacent end-arms 303 and each corresponding FPC 305, between the disks and have them adequately separated from each other is not trivial. This configuration is considered inefficient from the standpoint of achieving the highest possible capacity in a given HDD form factor, and also comes with a penalty to actuator inertia since an extra end-arm per actuator which carries just one HGA instead of two is an inefficient use of inertia/TB (terabyte). Further, there may be an increase in TMR (track mis-registration) with having end-arms from two different actuators in the shared space between co-rotating disks.

This may lead to the use of an odd number of disks, such as with the five (5) disks 352 of FIG. 3B, with the center disk of the stack being shared by the upper and lower head-stack assemblies (HSAs) 354a, 354b (or, more broadly, "actuator assemblies"), i.e., shared disk 352s. In such a configuration, the actuator-facing end-arms 353 of the upper and lower HSAs 354a, 354b that are serving the shared center disk 352s have two HGAs each, while the cover/base facing end-arms 351c, 351b have just one HGA each. Thus, the z-space required to fit only one actuator arm between each adjacent pair of disks, e.g., end-arms 353, rather than the two actuator arms 303 (one actuator-facing end-arm each, from the upper and lower actuators) of FIG. 3A, may lead to a more efficient dual-actuator system design, e.g., from the standpoint of HDD capacity, track following, and the like. Furthermore, it may be desirous to implement an odd-disk system (e.g., 9 disks) in a prior even-disk system (e.g., 8 disks) platform so that common mechanics and electronics may be utilized among the different products, thereby enabling reduction in development costs, schedule, and the like. However, if uniform disk spacing is employed in an odd-disk system, there would likely be inadequate z-space between the upper and lower HSAs 354a, 354b for routing the necessary electrical traces (e.g., via respective FPCs 355 serving the (e.g., lower head of) upper actuator end-arm 353 and the (e.g., upper head of) lower actuator end-arm 353), as depicted in FIG. 3B by overlapping FPCs 355 between the upper and lower HSAs 354a, 354b.

Dual-Actuator, Shared Disk Arm And Disk Arrangement Features

Figure 4:
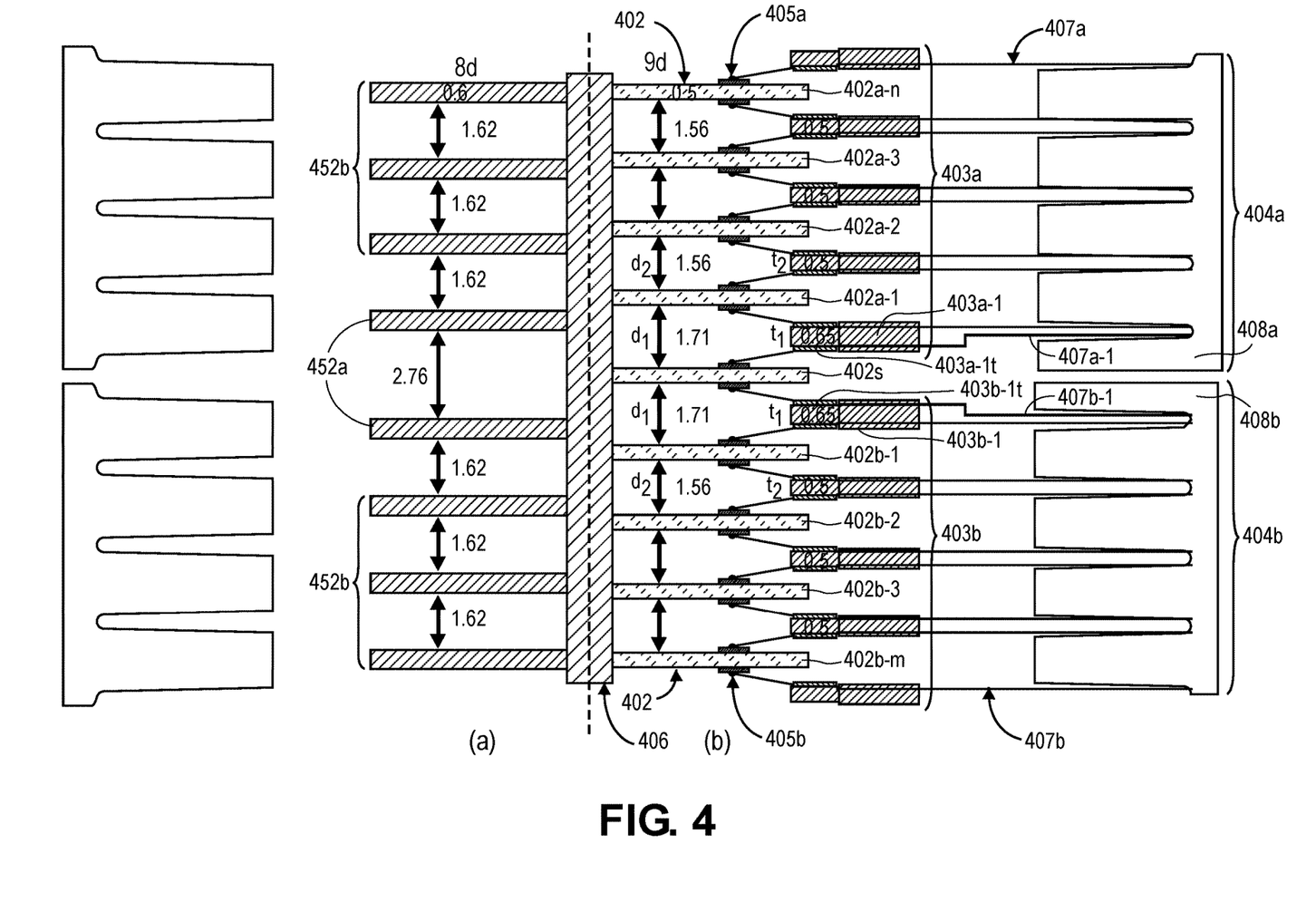
FIG. 4 is a side view diagram comparing an (a) 8-disk system and a (b) 9-disk, shared disk dual-actuator system, according to embodiments.

Embodiments described herein relate to approaches to configuring actuator arms and a disk stack comprising a shared disk in dual-actuator HDDs. In particular, embodiments involve disk spacing, actuator arm-tip thickness, and suspension tail biasing. FIG. 4 is a side view diagram comparing an (a) 8-disk (8d) system and a (b) 9-disk (9d), shared disk dual-actuator system, according to embodiments. Both the 8d system shown in left-hand portion (a) of FIG. 4 and the 9d system shown in right-hand portion (b) of FIG. 4 are depicted on an "imaginary" shared spindle for comparative purposes, while portion (b) is illustrative of inventive embodiments.

Disk Spacing

Because two arms are not positioned between any pair of adjacent disks (see, e.g., adjacent end-arms 303 of FIG. 3A), better z-height utilization is enabled. According to an embodiment, a data storage system such as the 9-disk system depicted in right-hand portion (b) of FIG. 4 (further applicable to any other odd-disk system), comprises a first head-stack assembly (HSA) 404a comprising a plurality of first arms 403a each coupled with a first head slider 405a comprising a read-write transducer (not visible here; see, e.g., read-write head 110a of FIG. 1), a second head-stack assembly (HSA) 404b comprising a plurality of second arms 403b each coupled with a second head slider 405b comprising a read-write transducer (not visible here; see, e.g., read-write head 110*a* of FIG. 1), and a plurality of disk media 402 (or "disk stack 402") rotatably mounted on a spindle 406. With this configuration the disk stack 402 includes (i) a shared disk medium 402*s* including a top surface positioned for operation with a first head slider 405*a*-1 of a first arm 403*a*-1 positioned above the shared disk medium 402*s* and a bottom surface positioned for operation with a second head slider 405*b*-1 of a second arm 403*b*-1 positioned below the shared disk medium 402*s*, (ii) an upper adjacent disk medium 402*a*-1 positioned adjacently above the shared disk medium 402*s*, (iii) one or more upper disk media 402*a*-2 through 402*a*-*n* above the upper adjacent disk medium 402*a*-1, where n represents an arbitrary number of disks that may vary from implementation to implementation, (iv) a lower adjacent disk medium 402*b*-1 positioned adjacently below the shared disk medium 402*s*, and (v) one or more lower disk media 402*b*-2 through 402*b*-*m* below the lower adjacent disk medium 402*b*-1, where m represents an arbitrary number of disks that may vary from implementation to implementation. According to an embodiment, a first distance ($d_1$) between the shared disk medium 402*s* and each of the upper adjacent disk medium 402*a*-1 and the lower adjacent disk medium 402*b*-1 is greater than a second distance ($d_2$) between each of the upper adjacent disk medium 402*a*-1 and the lower adjacent disk medium 402*b*-1 and a respective adjacent upper disk medium 402*a*-2 and lower disk medium 402*b*-2. Hence, with the larger spacing $d_1$ between the shared disk 402*s* and the upper and lower adjacent disks 402*a*-1, 402*b*-1, more E-block or actuator carriage (see, e.g., carriage 134 of FIG. 1) area is provided or enabled for each of the upper and lower HSAs 404*a*, 404*b* (and, more broadly, the upper and lower actuators) such as for electrical trace routing where needed. According to an embodiment, each of the upper disk media 402*a*-2 through 402*a*-*n* and the lower disk media 402*b*-2 through 402*b*-*m* are spaced the second distance ($d_2$) from a respective adjacent disk.

For a non-limiting example of the foregoing disk spacing arrangement, with the illustrated 8-disk (0.6 mm (millimeter) thick) configuration having no shared disk among the pair of actuators (see, e.g., upper and lower HSAs 304*a*, 304*b* of FIG. 3A), the disk spacing between the disks 452*a* operated on by each end-arm that faces the adjacent complementary actuator (not shown here; see, e.g., adjacent end-arms 303 of FIG. 3A) is depicted as 2.76 mm, while the disk spacing between the other disks 452*b* operated on by each other inner arm that does not face the adjacent complementary actuator (not shown here) is depicted as 1.62 mm. By contrast, with the illustrated 9-disk (0.5 mm thick) configuration having the shared disk 402*s* among the pair of upper and lower HSAs 404*a*, 404*b*, the disk spacing between the shared disk 402*s* and each upper and lower adjacent disk 402*a*-1, 402*b*-1 is depicted as 1.71 mm, while the disk spacing between each upper and lower adjacent disk 402*a*-1, 402*b*-1 and the other disks 402*a*-2 through 402*a*-*n*, 402*b*-2 through 402*b*-*m* is depicted as 1.56 mm.

Arm Arrangement

According to an embodiment, the first arm 403*a*-1 positioned above the shared disk medium 402*s* includes an arm tip 403*a*-1*t* having a first thickness ($t_1$) and the second arm 403*b*-1 positioned below the shared disk medium 402*s* includes an arm tip 403*b*-1*t* having the same first thickness ($t_1$), and at least one other first arm 403*a* of the first HSA 404*a* and at least one other second arm 403*b* of the second HSA 404*b* includes an arm tip having a second thickness ($t_2$), and where $t_1$ is greater than $t_2$ ($t_1 > t_2$). Stated otherwise, the arm tips 403*a*-1*t*, 403*b*-1*t* of the arms 403*a*-1, 403*b*-1 configured to operate on the shared disk 402*s* are thicker than the arm tips of other of the arms 403*a*, 403*b* of the first and second HSAs 404*a*, 404*b* that similarly carry two HGAs. The thicker arm tips 403*a*-1*t*, 403*b*-1*t* may be implemented, for example, by using thicker swage pads/plates at the distal end (i.e., the end nearer head sliders 405*a*-1, 405*b*-1) of arms 403*a*-1, 403*b*-1 than with the other arms 403*a*, 403*b*. Furthermore, configuring each arm 403*a*, 403*b* in its entirety to be the first thickness $t_1$, rather than just the respective arm tips, is contemplated. Note that the outermost arm of each HSA 404*a*, 404*b* (i.e., the arm that carries a single HGA) may be configured differently and have a different arm-tip thickness than the other arms of the same HSA, as the outermost arms are unique in carrying only the single HGA.

Regardless of the manner of implementation, this feature provides for maintaining a common head-gimbal assembly (HGA)/suspension z-height (i.e., distance to corresponding disk surface) across all the arms 403*a*, 403*a*-1, 403*b*, 403*b*-1 of the first and second HSAs 404*a*, 404*b*, even in view of the different disk spacing $d_1$ and $d_2$, which may enable better and more common actuator performance with respect to the first and second HSAs 404*a*, 404*b*. Thus, a lower surface of the first arm 403*a*-1 is positioned a first distance above the top surface of the shared disk medium 402*s*, an upper surface of the second arm 403*b*-1 is positioned the same first distance below the bottom surface of the shared disk medium 402*s*, and each other first and second arm 403*a*, 403*b* is positioned the same first distance from a surface of the disk medium 402 on which the arm operates. Continuing with the foregoing non-limiting example, with the illustrated 9-disk (0.5 mm (millimeter) thick) configuration having the shared disk 402*s* among the pair of upper and lower HSAs 404*a*, 404*b*, the disk spacing between the shared disk 402*s* and each upper and lower adjacent disk 402*a*-1, 402*b*-1 being depicted as 1.71 mm while the disk spacing between each upper and lower adjacent disk 402*a*-1, 402*b*-1 and the other disks 402*a*-2 through 402*a*-*n*, 402*b*-2 through 402*b*-*m* being depicted as typically 1.56 mm, note the 0.15 mm difference in disk spacing (e.g., for use for trace routing). Thus, in order to maintain the HGA/suspension z-heights across all the head sliders 405*a*, 405*b* of both HSAs 404*a*, 404*b* and the entire disk 402 stack, a 0.65 mm thick arm tip 403*a*-1*t*, 403*b*-1*t* may be implemented instead of the otherwise 0.5 mm thick arm tip for the other arms 403*a*, 403*b* carrying two head sliders 505*a*, 505*b*. That is, the additional 0.15 mm of arm tip thickness (0.5 mm to 0.65 mm) matches or compensates for the 0.15 mm difference in disk spacing.

Suspension Tail Biasing

According to an embodiment, the first HSA 404*a* further comprises a first suspension coupling each first arm 403*a* with each first head slider 405*a*, where each first suspension comprises a suspension tail 407*a* comprising electrical traces between each first head slider 405*a* and a respective portion of a flexible printed circuit (FPC) 408*a*, and the second HSA 404*b* further comprises a second suspension coupling each second arm 403*b* with each second head slider 405*b*, where each second suspension comprises a suspension tail 407*b* comprising electrical traces between each second head slider and a respective portion of a flexible printed circuit (FPC). Here, the suspension tail 407*a*-1 of the first arm 403*a*-1 positioned above the shared disk medium 402*s* is configured such that an FPC end of the suspension tail 407*a*-1 is farther in the z-height direction (e.g., along the axis of the disk stack 402) from the shared disk medium 402*s* than a slider end of the suspension tail 407*a*-1, and the suspension tail 407*b*-1 of the second arm 403*b*-1 positioned below the shared disk medium 402s is configured such that an FPC end of the suspension tail 407b-1 is farther in the z-height direction from the shared disk medium 402s than a slider end of the suspension tail 407b-1. Thus, the suspension tails 407a-1, 407b-1 that correspond to the arms 403a-1, 403b-1 that operate on the shared disk 402s are biased (e.g., bent, or otherwise routed) away from the shared disk 402s, in the direction from each arm 403a-1, 403b-1 toward each FPC 408a, 408b.

That is, the structural flexibility of these suspension tails 407a-1, 407b-1 (e.g., having thin metal base/substrate on which electrical traces are mounted/etched) is leveraged to allow for an offset away from the shared disk 402s and, therefore, to provide for more clearance between the FPCs 408a, 408b and the HSAs 404a, 404b more generally. Note that while each suspension tail 407a-1, 407b-1 is depicted in FIG. 4 as seemingly bent/formed into a stepped shape for purposes of diagrammatic clarity, the manner in which the suspension tail 407a-1, 407b-1 are formed for the stated purpose may vary from implementation to implementation, with a likely candidate being to bend/form each suspension tail 407a-1, 407b-1 into a curved shape between two certain fixed points at different z-heights.

Note that the foregoing disk spacing, arm arrangement, and suspension tail biasing features may each be implemented into an HDD individually or in a combination of such features.

Dual-Actuator, Shared Disk In Even-Numbered Disk Stack

Figure 5:
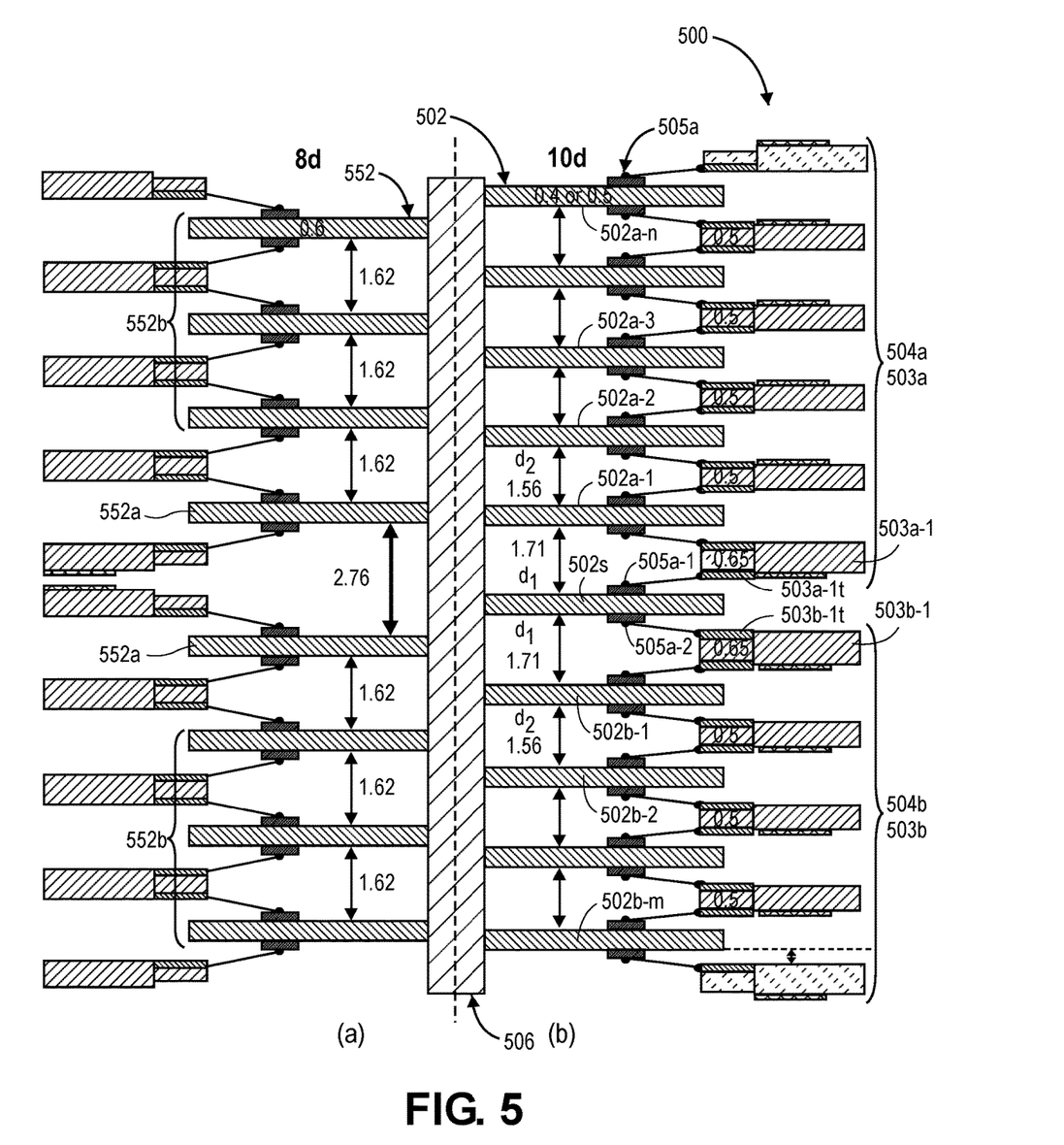
FIG. 5 is a side view diagram comparing an (a) 8-disk system with a (b) 10-disk, shared disk asymmetric dual-actuator system, according to an embodiment.

Previous comparisons have been made between even-numbered and odd-numbered disk stacks (see, e.g., FIGS. 3A-3B) and, more particularly, between an 8-disk (8d) system and a (b) 9-disk (9d) shared disk dual-actuator system (see, e.g., FIG. 4). FIG. 5 is a side view diagram comparing an (a) 8-disk (8d) system with a (b) 10-disk (10d), shared disk asymmetric dual-actuator system, according to an embodiment. Both the 8d system shown in left-hand portion (a) of FIG. 5 and the 10d system shown in right-hand portion (b) of FIG. 5 are depicted on an "imaginary" shared spindle for comparative purposes, while portion (b) is illustrative of inventive embodiments.

Here again, because two arms are not positioned between any pair of adjacent disks in the (b) 10d configuration as in the (a) 8d configuration, better z-height utilization is enabled. According to an embodiment, a data storage system such as the 10-disk system depicted in right-hand portion (b) of FIG. 5 (further applicable to any other even-disk system), comprises a first head-stack assembly (HSA) 504a comprising a plurality of first arms 503a each coupled with a first head slider 505a comprising a read-write transducer (not visible here; see, e.g., read-write head 110a of FIG. 1), a second head-stack assembly (HSA) 504b comprising a plurality of second arms 503b each coupled with a second head slider 505b comprising a read-write transducer (not visible here; see, e.g., read-write head 110a of FIG. 1), and a plurality of disk media 502 (or "disk stack 502") rotatably mounted on a spindle 506. Note here the asymmetry of the actuator system 500, where the upper HSA 504a comprises a first number of arms 503a (e.g., six (6) as shown here) and the lower HSA 504b comprises a different second number of arms 503b (e.g., five (5) as shown here).

With this configuration the disk stack 502 includes (i) a shared disk medium 502s including a top surface positioned for operation with a first head slider 505a-1 of a first arm 503a-1 positioned above the shared disk medium 502s and a bottom surface positioned for operation with a second head slider 505b-1 of a second arm 503b-1 positioned below the shared disk medium 502s, (ii) an upper adjacent disk medium 502a-1 positioned adjacently above the shared disk medium 502s, (iii) one or more upper disk media 502a-2 through 502a-n above the upper adjacent disk medium 502a-1, where n represents an arbitrary number of disks that may vary from implementation to implementation, (iv) a lower adjacent disk medium 502b-1 positioned adjacently below the shared disk medium 502s, and (v) one or more lower disk media 502b-2 through 502b-m below the lower adjacent disk medium 502b-1, where m represents an arbitrary number of disks that may vary from implementation to implementation. According to an embodiment, a first distance ($d_1$) between the shared disk medium 502s and each of the upper adjacent disk medium 502a-1 and the lower adjacent disk medium 502b-1 is greater than a second distance ($d_2$) between each of the upper adjacent disk medium 502a-1 and the lower adjacent disk medium 502b-1 and a respective adjacent upper disk media 502a-2 and lower disk media 502b-2. Hence, with the larger spacing di between the shared disk 502s and the upper and lower adjacent disks 502a-1, 502b-1, more E-block or actuator carriage (see, e.g., carriage 134 of FIG. 1) area is provided or enabled for each of the upper and lower HSAs 504a, 504b (and, more broadly, the upper and lower actuators) such as for electrical trace routing where needed. The use of the asymmetric actuator system 500 enables the employment of shared disk 502s and thus the implementation of the disk spacing, arm arrangement, and/or suspension tail biasing features described in more detail elsewhere herein (see, e.g., FIG. 4 and related description). According to an embodiment, each of the upper disk media 502a-2 through 502a-n and the lower disk media 502b-2 through 502b-m are spaced the second distance ($d_2$) from a respective adjacent disk.

For a non-limiting example of the foregoing disk spacing arrangement, with the illustrated 8-disk (0.6 mm (millimeter) thick) configuration having no shared disk among the pair of HSAs (see, e.g., upper and lower HSAs 304a, 304b of FIG. 3A), the disk spacing between the disks 552a operated on by each end-arm that faces the adjacent complementary actuator (not shown here; see, e.g., adjacent end-arms 303 of FIG. 3A) is depicted as 2.76 mm, while the disk spacing between the other disks 552b operated on by each other inner arm that does not face the adjacent complementary actuator (not shown here) is depicted as 1.62 mm. By contrast, with the illustrated 10-disk (0.4 mm or 0.5 mm thick) configuration having the shared disk 502s among the pair of upper and lower HSAs 504a, 504b, the disk spacing between the shared disk 502s and each upper and lower adjacent disk 502a-1, 502b-1 is depicted as 1.71 mm, while the disk spacing between each upper and lower adjacent disk 502a-1, 502b-1 and the other disks 502a-2 through 502a-n, 502b-2 through 502b-m is depicted as 1.56 mm.

Similarly to the 9-disk configuration of FIG. 4(b), and according to an embodiment, the first arm 503a-1 positioned above the shared disk medium 502s includes an arm tip 503a-1t having a first thickness ($t_1$) and the second arm 503b-1 positioned below the shared disk medium 502s includes an arm tip 503b-1t having the same first thickness ($t_1$), and at least one other first arm 503a of the first HSA 504a and at least one other second arm 503b of the second HSA 504b includes an arm tip having a second thickness ($t_2$), and where $t_1$ is greater than $t_2$ ($t_1 > t_2$). Stated otherwise, the arm tips 503a-1t, 503b-1t of the arms 503a-1, 503b-1 configured to operate on the shared disk 502s are thicker than the arm tips of other of the arms 503a, 503b of the first and second HSAs 504a, 504b that similarly carry two HGAs. The thicker arm tips 503a-1t, 503b-1t may be implemented, for example, by using thicker swage pads/plates at the distal end (i.e., the end nearer head sliders 505a, 505b) of arms 503a-1, 503b-1 than with the other arms 503a, 503b. Furthermore, configuring each arm 503a, 503b in its entirety to be the first thickness $t_1$, rather than just the respective arm tips, is contemplated. Note that the outermost arm of each HSA 504a, 504b (i.e., the arm that carries a single HGA) may be configured differently and have a different arm-tip thickness than the other arms of the same HSA, as the outermost arms are unique in carrying only the single HGA.

Regardless of the manner of implementation, this feature provides for maintaining a common head-gimbal assembly (HGA)/suspension z-height (i.e., distance to corresponding disk surface) across all the arms 503a, 503a-1, 503b, 503b-1 of the first and second HSAs 504a, 504b, even in view of the different disk spacing $d_1$ and $d_2$, which may enable better and more common actuator performance with respect to the first and second HSAs 504a, 504b. Thus, a lower surface of the first arm 503a-1 is positioned a first distance above the top surface of the shared disk medium 502s, an upper surface of the second arm 503b-1 is positioned the same first distance below the bottom surface of the shared disk medium 502s, and each other first and second arm 503a, 503b is positioned the same first distance from a surface of the disk medium 502 on which the arm operates. Continuing with the foregoing non-limiting example, with the illustrated 10-disk (0.4 mm or 0.5 mm thick) configuration having the shared disk 502s among the pair of upper and lower HSAs 504a, 504b, the disk spacing between the shared disk 502s and each upper and lower adjacent disk 502a-1, 502b-1 being depicted as 1.71 mm while the disk spacing between each upper and lower adjacent disk 502a-1, 502b-1 and the other disks 502a-2 through 502a-n, 502b-2 through 502b-m being depicted as typically 1.56 mm, note the 0.15 mm difference in disk spacing (e.g., for use for trace routing). Thus, in order to maintain the HGA/suspension z-heights across all the head sliders 505a, 505b of both HSAs 504a, 504b and the entire disk 502 stack, a 0.65 mm thick arm tip 503a-1t, 503b-1t may be implemented instead of the otherwise 0.5 mm thick arm tip for the other arms 503a, 503b carrying two head sliders 505a, 505b. That is, the additional 0.15 mm of arm tip thickness (0.5 mm to 0.65 mm) matches or compensates for the 0.15 mm difference in disk spacing.

Again similarly to the 9-disk configuration of FIG. 4(b), and according to an embodiment, the first HSA 504a further comprises a first suspension coupling each first arm 503a with each first head slider 505a, where each first suspension comprises a suspension tail (see, e.g., FIG. 4(b)) comprising electrical traces between each first head slider 505a and a respective portion of a corresponding FPC (see, e.g., FIG. 4(b)), and the second HSA 504b further comprises a second suspension coupling each second arm 503b with each second head slider 505b, where each second suspension comprises a suspension tail (see, e.g., FIG. 4(b)) comprising electrical traces between each second head slider and a respective portion of a corresponding FPC (see, e.g., FIG. 4(b)). Here also, the suspension tail of the first arm 503a-1 positioned above the shared disk medium 502s may be configured such that an FPC end of the suspension tail is farther in the z-height direction (e.g., along the axis of the disk stack 502) from the shared disk medium 502s than a slider end of the suspension tail, and the suspension tail of the second arm 503b-1 positioned below the shared disk medium 502s is configured such that an FPC end of the suspension tail is farther in the z-height direction from the shared disk medium 502s than a slider end of the suspension tail. Thus, the suspension tails that correspond to the arms 503a-1, 503b-1 that operate on the shared disk 502s are biased (e.g., bent, or otherwise routed) away from the shared disk 502s, in the direction from each arm 503a-1, 503b-1 toward each FPC.

Physical Description Of An Illustrative Operating Context

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions And Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alpha-numeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A data storage device comprising:
  a first head-stack assembly (HSA) comprising a plurality of first arms each coupled with a first head slider comprising a read-write transducer;
  a second head-stack assembly (HSA) comprising a plurality of second arms each coupled with a second head slider comprising a read-write transducer; and
  a plurality of disk media rotatably mounted on a spindle, including:
    a shared disk medium including a top surface positioned for operation with a first head slider of a first arm of the first HSA, the first arm positioned above the shared disk medium, and a bottom surface positioned for operation with a second head slider of a second arm of the second HSA, the second arm positioned below the shared disk medium,
an upper adjacent disk medium positioned adjacently above the shared disk medium,
one or more upper disk media above the upper adjacent disk medium, a lower adjacent disk medium positioned adjacently below the shared disk medium, and
one or more lower disk media below the lower adjacent disk medium;
wherein a first distance between the shared disk medium and each of the upper adjacent disk medium and the lower adjacent disk medium is greater than a second distance between each of the upper adjacent disk medium and the lower adjacent disk medium and a respective adjacent upper disk medium and lower disk medium.

2. The data storage device of claim 1, wherein:
the first arm positioned above the shared disk medium includes an arm tip having a first thickness;
at least one other first arm of the first HSA includes an arm tip having a second thickness;
the second arm positioned below the shared disk medium includes an arm tip having the first thickness;
at least one other second arm of the second HSA includes an arm tip having the second thickness; and
the first thickness is greater than the second thickness.

3. The data storage device of claim 2, wherein:
a lower surface of the first arm is positioned a first distance above the top surface of the shared disk medium;
an upper surface of the second arm is positioned the first distance below the bottom surface of the shared disk medium; and
each other first arm and second arm is positioned the same first distance from a surface of the disk medium on which the arm operates.

4. The data storage device of claim 1, wherein:
the first HSA further comprises a first suspension coupling each first arm with each first head slider, each first suspension comprising a suspension tail comprising electrical traces between each first head slider and a respective portion of a flexible printed circuit (FPC);
the second HSA further comprises a second suspension coupling each second arm with each second head slider, each second suspension comprising a suspension tail comprising electrical traces between each second head slider and a respective portion of a flexible printed circuit (FPC);
the suspension tail of the first arm positioned above the shared disk medium is configured such that an FPC end of the suspension tail is farther in a z-height direction from the shared disk medium than a slider end of the suspension tail; and
the suspension tail of the second arm positioned below the shared disk medium is configured such that an FPC end of the suspension tail is farther in the z-height direction from the shared disk medium than a slider end of the suspension tail.

5. The data storage device of claim 1, wherein:
the first arm positioned above the shared disk medium includes an arm tip having a first thickness;
at least one other first arm of the first HSA includes an arm tip having a second thickness;
the second arm positioned below the shared disk medium includes an arm tip having the first thickness;
at least one other second arm of the second HSA includes an arm tip having the second thickness;
the first thickness is greater than the second thickness;
the first HSA further comprises a first suspension coupling each first arm with each first head slider, each first suspension comprising a suspension tail comprising electrical traces between each first head slider and a respective portion of a flexible printed circuit (FPC);
the second HSA further comprises a second suspension coupling each second arm with each second head slider, each second suspension comprising a suspension tail comprising electrical traces between each second head slider and a respective portion of a flexible printed circuit (FPC);
the suspension tail of the first arm positioned above the shared disk medium is configured such that an FPC end of the suspension tail is farther in a z-height direction from the shared disk medium than a slider end of the suspension tail; and
the suspension tail of the second arm positioned below the shared disk medium is configured such that an FPC end of the suspension tail is farther in the z-height direction from the shared disk medium than a slider end of the suspension tail.

6. The data storage device of claim 5, wherein:
a lower surface of the first arm is positioned a first distance above the top surface of the shared disk medium;
an upper surface of the second arm is positioned the first distance below the bottom surface of the shared disk medium; and
each other first arm and second arm is positioned the same first distance from a surface of the disk medium on which the arm operates.

7. The data storage device of claim 1, wherein the plurality of disk media consists of an odd number of disk media.

8. The data storage device of claim 1, wherein:
the plurality of disk media consists of an even number of disk media; and
the first HSA and the second HSA comprise a different number of first and second arms.

9. A hard disk drive (HDD) head-stack assembly (HSA) comprising:
a plurality of actuator arms each coupled with at least one head slider comprising a read-write transducer, and wherein each of an outer actuator arm and at least one inner actuator arm is coupled with two head sliders;
a flexible printed circuit (FPC) coupled with an actuator carriage; and
a suspension coupling each actuator arm with a corresponding head slider, each suspension comprising a suspension tail comprising electrical traces between each head slider and a respective portion of the FPC;
wherein:
a first distance between the two head sliders of the outer actuator arm is greater than a second distance between the two head sliders of the at least one inner actuator arm;
the suspension tail of the outer actuator arm is configured such that an FPC end of the suspension tail is farther in a z-height direction from an outer-most head slider corresponding to the outer actuator arm than a slider end of the suspension tail.

10. The HSA of Claim 9, further comprising a pivot shaft onto which the plurality of actuator arms is mounted in a hard disk drive.

11. The HSA of claim 9, wherein:
the outer actuator arm comprises an arm tip having a first thickness;
each inner actuator arm coupled with two head sliders comprises an arm tip having a second thickness; and
the first thickness is greater than the second thickness.

12. The HSA of claim 11, further comprising a pivot shaft onto which the plurality of actuator arms is mounted in a hard disk drive.

13. A hard disk drive multi-actuator system, the system comprising:
a first actuator assembly comprising a first head-stack assembly (HSA) comprising a plurality of first arms each coupled with a first head slider comprising a read-write transducer configured to write to and to read from disk media;
a second actuator assembly comprising a second head-stack assembly (HSA) comprising a plurality of second arms each coupled with a second head slider comprising a read-write transducer configured to write to and to read from disk media;
a plurality of disk media rotatably mounted on a spindle, including:
a shared disk medium including a top surface positioned for operation with a first head slider of a first arm of the first HSA, the first arm positioned above the shared disk medium, and a bottom surface positioned for operation with a second head slider of a second arm of the second HSA, the second arm positioned below the shared disk medium,
an upper adjacent disk medium positioned adjacently above the shared disk medium,
one or more upper disk media above the upper adjacent disk medium,
a lower adjacent disk medium positioned adjacently below the shared disk medium, and
one or more lower disk media below the lower adjacent disk medium;
wherein:
the first arm positioned above the shared disk medium includes an arm tip having a first thickness;
at least one other first arm of the first HSA includes an arm tip having a second thickness;
the second arm positioned below the shared disk medium includes an arm tip having the first thickness;
at least one other second arm of the second HSA includes an arm tip having the second thickness; and
the first thickness is greater than the second thickness.

14. The system of claim 13, wherein a first distance between the shared disk medium and each of the upper adjacent disk medium and the lower adjacent disk medium is greater than a second distance between each of the upper adjacent disk medium and the lower adjacent disk medium and a respective adjacent upper disk medium and lower disk medium.

15. The system of claim 13, wherein:
a lower surface of the first arm is positioned a first distance above the top surface of the shared disk medium;
an upper surface of the second arm is positioned the first distance below the bottom surface of the shared disk medium; and
each other first arm and second arm is positioned the same first distance from a surface of the disk medium on which the arm operates.

16. The system of claim 13, wherein:
the first HSA further comprises a first suspension coupling each first arm with each first head slider, each first suspension comprising a suspension tail comprising electrical traces between each first head slider and a respective portion of a flexible printed circuit (FPC);
the second HSA further comprises a second suspension coupling each second arm with each second head slider, each second suspension comprising a suspension tail comprising electrical traces between each second head slider and a respective portion of a flexible printed circuit (FPC);
the suspension tail of the first arm positioned above the shared disk medium is configured such that an FPC end of the suspension tail is farther in a z-height direction from the shared disk medium than a slider end of the suspension tail; and
the suspension tail of the second arm positioned below the shared disk medium is configured such that an FPC end of the suspension tail is farther in the z-height direction from the shared disk medium than a slider end of the suspension tail.

17. The system of claim 13, wherein the plurality of disk media consists of an odd number of disk media.

18. The system of claim 13, wherein:
the plurality of disk media consists of an even number of disk media.

19. The system of claim 18, wherein:
the first HSA and the second HSA comprise a different number of first and second arms.

20. The system of claim 19, further comprising:
a shared shaft on which the first actuator assembly and the second actuator assembly are both rotatably coupled.

* * * * *